US012701523B2

(12) United States Patent
Yao et al.

(10) Patent No.: US 12,701,523 B2
(45) Date of Patent: Aug. 4, 2026

(54) TIMING ADVANCE (TA) MAINTENANCE IN NON-TERRESTRIAL NETWORKS (NTN)

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haijing Hu, Los Gatos, CA (US); Haitong Sun, Cupertino, CA (US); Hong He, San Jose, CA (US); Huaning Niu, San Jose, CA (US); Jie Cui, San Jose, CA (US); Oghenekome Oteri, San Diego, CA (US); Sarma V. Vangala, Campbell, CA (US); Sigen Ye, San Diego, CA (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 18/249,776

(22) PCT Filed: Oct. 22, 2020

(86) PCT No.: PCT/CN2020/122988
    § 371 (c)(1),
    (2) Date: Apr. 20, 2023

(87) PCT Pub. No.: WO2022/082662
    PCT Pub. Date: Apr. 28, 2022

(65) Prior Publication Data
    US 2023/0422195 A1      Dec. 28, 2023

(51) Int. Cl.
    *H04W 56/00*        (2009.01)
    *H04W 84/06*        (2009.01)

(52) U.S. Cl.
    CPC ........ *H04W 56/0045* (2013.01); *H04W 84/06* (2013.01)

(58) Field of Classification Search
    CPC ............. H04W 56/0045; H04W 84/06; H04W 56/006; H04W 72/231; H04B 7/18541; H04B 7/18513; H04B 7/18519
    See application file for complete search history.

(56) References Cited

U.S. PATENT DOCUMENTS

| | | |
|---|---|---|
| 7,538,726 B1 | 5/2009 | Tester et al. |
| 2019/0349077 A1 | 11/2019 | Alasti |

(Continued)

FOREIGN PATENT DOCUMENTS

| | | |
|---|---|---|
| CN | 109831821 A | 5/2019 |
| CN | 111095820 A | 5/2020 |

(Continued)

OTHER PUBLICATIONS

PCT Search Report and Written Opinion dated Jul. 2, 2021 in connection with PCT Application No. PCT/CN2020/122988.

(Continued)

*Primary Examiner* — Ashley Shivers
(74) *Attorney, Agent, or Firm* — Eschweiler & Potashnik, LLC; Ningjiao Zhang

(57) ABSTRACT

Techniques discussed herein may better ensure proper timing and synchronization of transmissions within a wireless communications network that includes a terrestrial network and a non-terrestrial network (NTN). A user equipment (UE) may maintain (e.g., determine and update on an ongoing basis) a timing advance (TA) value that the UE may apply to uplink (UL) transmissions to account for propagation delays, including changes in propagation delays, between the UE, NTN, and terrestrial network. TA maintenance may be based on network broadcasts, random access channel (Continued)

(RACH) procedures, control messages, timing drift rates (e.g., of the UE or NTN satellite), beam switching, and more.

20 Claims, 10 Drawing Sheets

(56) References Cited

U.S. PATENT DOCUMENTS

| | | |
|---|---|---|
| 2019/0387547 A1 | 12/2019 | Shin |
| 2020/0153500 A1 | 5/2020 | Kim et al. |
| 2020/0196263 A1 | 6/2020 | Heyn |
| 2023/0362857 A1* | 11/2023 | Ghanbarinejad . H04W 56/0045 |

FOREIGN PATENT DOCUMENTS

| | | |
|---|---|---|
| CN | 111316723 A | 6/2020 |
| CN | 111565448 A | 8/2020 |
| CN | 111615186 A | 9/2020 |
| CN | 111770565 A | 10/2020 |

OTHER PUBLICATIONS

Huawei et al., "Discussion on timing advance and RACH procedures for NTN"; 3GPP TSG RAN WG1; Meeting #96bis R1-1904000; Apr. 12, 2019 (Apr. 12, 2019); pp. 1-7.

Fraunhofer IIS et al., "Timing Advance Adjustment for Satellite Communications (NTN)"; 3GPP TSG RAN WG1; Meeting RAN1 #96bis R1-1904225; Apr. 12, 2019 (Apr. 12, 2019); pp. 1-4.

5G; NR; Multiplexing and channel coding; (3GPP TS 38.212 version 16.2.0 Release 16); ETSI TS 138 212 V16.2.0; Jul. 2020.

5G; NR; Physical layer procedures for control (3GPP TS 38.213 version 16.2.0 Release 16); ETSI TS 138 213 V16.2.0; Jul. 2020.

5G; NR; Physical layer procedures for data; (3GPP TS 38.214 version 16.2.0 Release 16); ETSI TS 138 214 V16.2.0; Jul. 2020.

5G; NR; Radio Resource Control (RRC); Protocol specification; (3GPP TS 38.331 version 16.1.0 Release 16); ETSI TS 138 331 V16.1.0; Jul. 2020.

International Preliminary Report on Patentability dated Apr. 13, 2023 in connection with PCT Application No. PCT/CN2020/122988.

Chinese Office Action dated Mar. 1, 2025 in connection with application No. 202080106566.6.

Hiawei, HiSilicon; Discussion on Doppler compensation, timing advance and RACH for NTN; 3GPP TSG RAN WG1 Meeting #98bis; R1-1910064; Oct. 14, 2019.

Sony; Enhancement for UL time synchronization; 3GPP TSG RAN WG1 #102-e; R1-2005574; Aug. 17, 2020.

OPPO; Discussion on enhancement of UL time and frequency synchronization; 3GPP TSG RAN WG1 #102; R1-2006030; Aug. 17, 2020.

European Extended Search Report mailed Oct. 2, 2023 in reference with Application No. EP20958244.

European Extended Search Report dated Nov. 29, 2024 in connection with Application No. 24195638.2.

MCC Support; "Final Report of 3GPP TSG RAN WG1 #86 v1.0.0"; 3GPP TSG RAN WG1 Meeting #86 bis R1-1608562; Oct. 10, 2016.

Chinese Search Report dated Jan. 5, 2026 in connection with Application No. 202080106566.

* cited by examiner

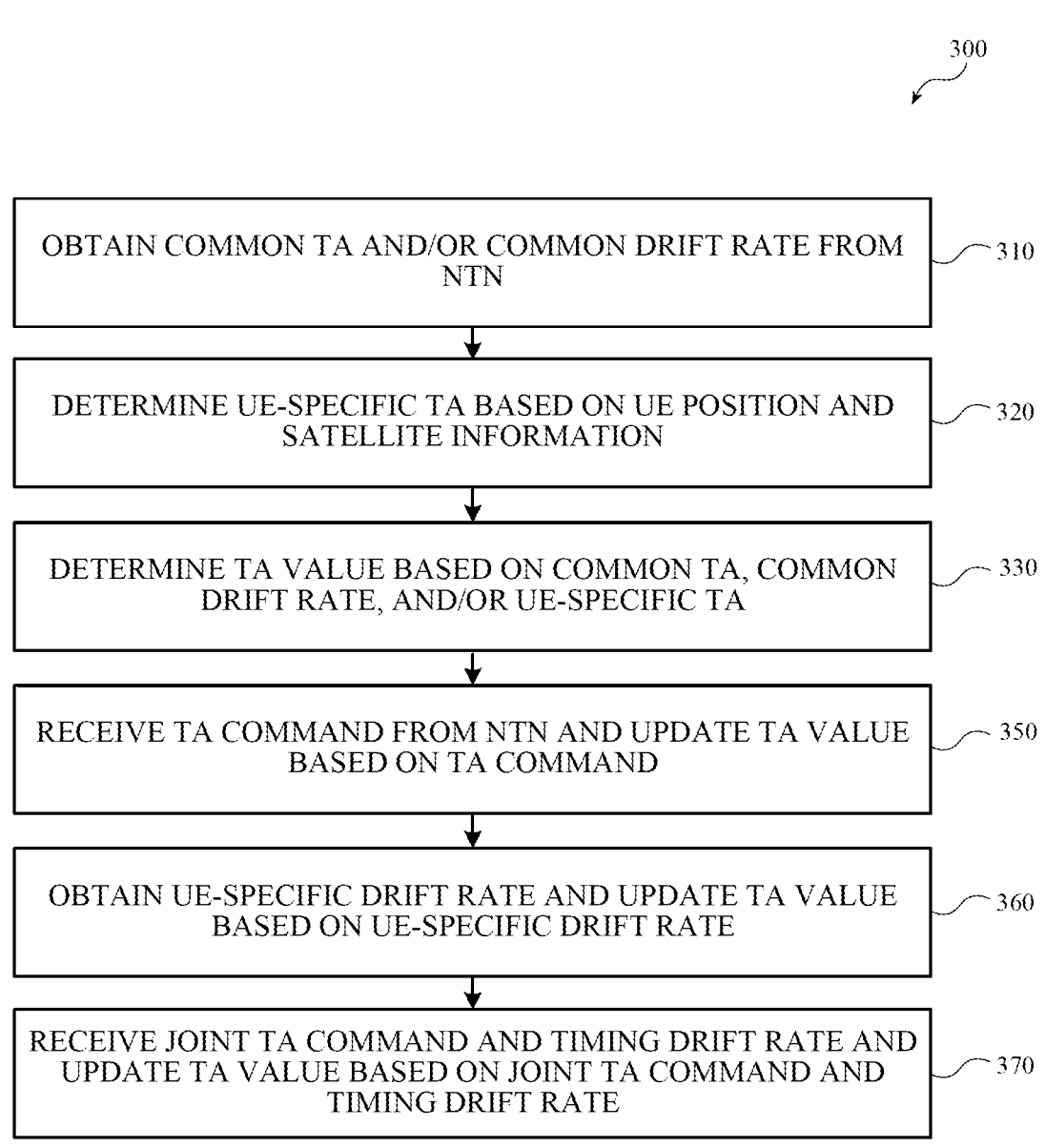

300

OBTAIN COMMON TA AND/OR COMMON DRIFT RATE FROM NTN —310

DETERMINE UE-SPECIFIC TA BASED ON UE POSITION AND SATELLITE INFORMATION —320

DETERMINE TA VALUE BASED ON COMMON TA, COMMON DRIFT RATE, AND/OR UE-SPECIFIC TA —330

RECEIVE TA COMMAND FROM NTN AND UPDATE TA VALUE BASED ON TA COMMAND —350

OBTAIN UE-SPECIFIC DRIFT RATE AND UPDATE TA VALUE BASED ON UE-SPECIFIC DRIFT RATE —360

RECEIVE JOINT TA COMMAND AND TIMING DRIFT RATE AND UPDATE TA VALUE BASED ON JOINT TA COMMAND AND TIMING DRIFT RATE —370

*FIG. 3*

TIMING ADVANCE (TA) MAINTENANCE IN NON-TERRESTRIAL NETWORKS (NTN)

REFERENCE TO RELATED APPLICATIONS

This application is a National Phase entry application of International Patent Application No. PCT/CN2020/122988 filed Oct. 22, 2020, entitled "TIMING ADVANCE (TA) MAINTENANCE IN NONTERRESTRIAL NETWORKS (NTN)," the entire disclosures of which is incorporated herein by reference.

FIELD

This disclosure relates to wireless communication networks, and more specifically, to techniques for maintaining timing and synchronization within a non-terrestrial network (NTN). Other aspects and techniques are also described.

BACKGROUND

As the number of mobile devices within wireless networks, and the demand for mobile data traffic, continue to increase, changes are made to system requirements and architectures to better address current and anticipated demands. For example, some wireless communication networks (e.g., fifth generation (5G) or new radio (NR) networks) may be developed to include non-terrestrial networks (NTN) comprising one or more satellites. In such scenarios, the satellites may operate as transparent network nodes linking user equipment (UEs) with a ground-based portions of the network, such as base stations and core network (CN).

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 3 is a flowchart of an example process for TA maintenance.

DETAILED DESCRIPTION

Figure 1:
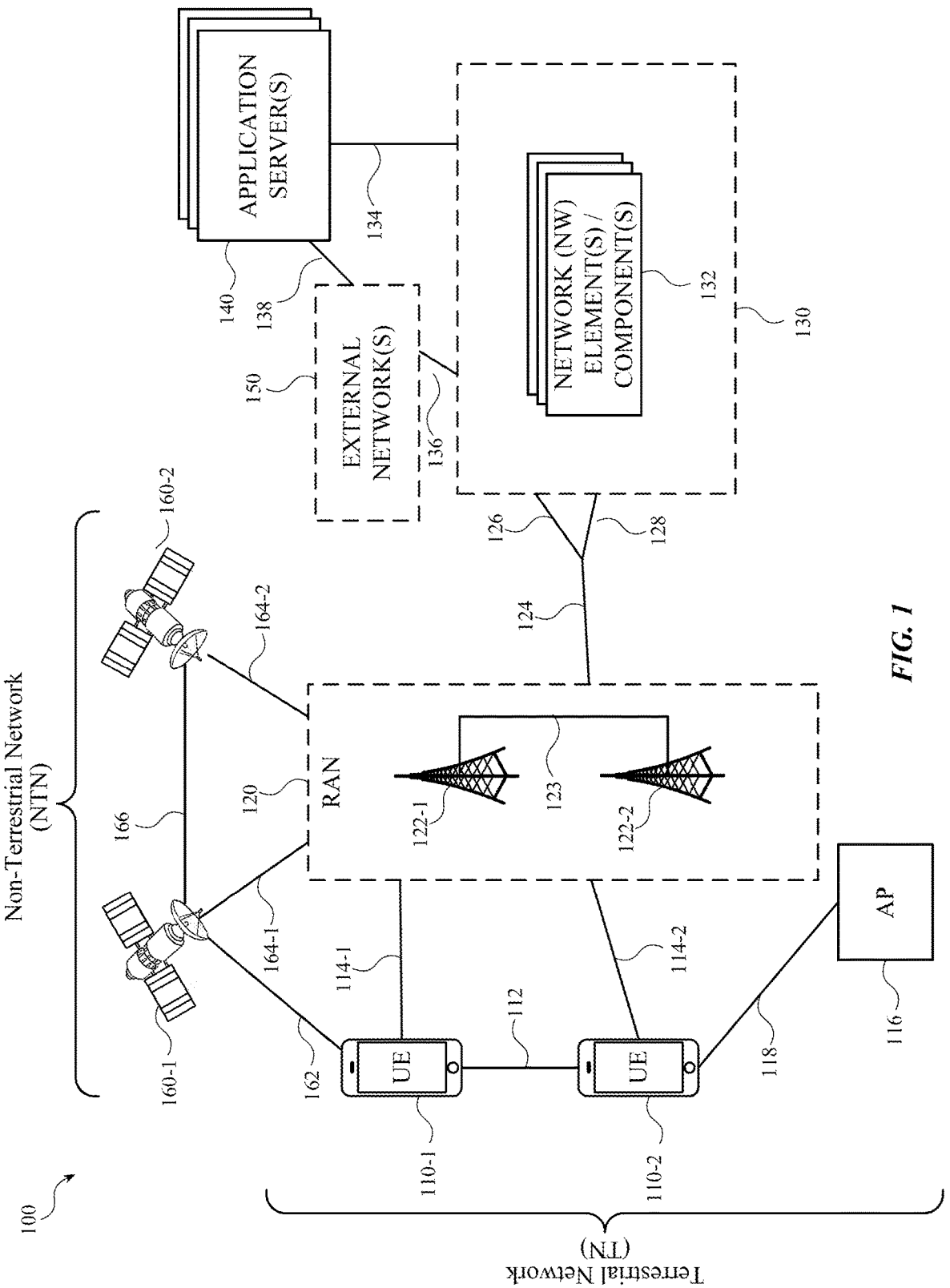
FIG. 1 is a diagram of an example network according to one or more implementations described herein

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Mobile communication networks may include one or more types and/or generations of wireless communication networks, such as 4th generation (4G) networks, 5th generation (5G) or new radio (NR) networks, etc. Such networks may include user equipment (UEs) and base stations that communicate with one another wirelessly. Such networks may also include, or be connected to, non-terrestrial networks (NTNs) so that terrestrial network devices (e.g., user equipment (UEs), base stations, etc.) may communicate with one another via non-terrestrial devices (e.g., low earth orbit (LEO) satellites, geostationary earth orbit (GEO) satellites, etc.).

In this capacity, a satellite may operate transparently by relaying communications between UEs and base stations without demodulation or remodulation. Alternatively, a satellite may operate regeneratively by using on-board processing capabilities to, for example, demodulate uplink (UL) signals and remodulate downlink (DL) signals between UEs and base stations. In some implementations, the satellite may be capable of operating as a base station or another type of network access (AP) of the wireless terrestrial network. As such, references herein to functions performed by a base station may also, or alternatively, be performed by a satellite in a given scenario.

Enabling UEs to connect to a wireless terrestrial network via satellites may enhance network connectivity and reliability by increasing the quantity of APs that UEs may use to communicate with the network. This may also increase the collective coverage area of the network as the transmission capabilities of a satellite (e.g., coverage area, footprint, etc.) may be greater than those of a terrestrial base station. This increase in network coverage may result in scenarios where UEs directly connected to a terrestrial base station (e.g., UEs within the coverage area of the base station) are geographically closer to the base station, and therefore may have different transmission timing constraints (e.g., lower propagation delays), than UEs connected to the base station via a satellite or UEs connected to a satellite operating as a base station. Additionally, UE transmission propagation delays may be affected, at least in part, by the satellite type since, for example, a maximum differential delay of a GEO satellite may be 10.3 micrometers (μm) whereas the max differential delay of a LEO may be 3.12 μm and 3.18 μm depending on the LEO altitude.

A propagation delay, as used herein, may be based on UL transmissions between a UE and a designated reference point (RP) (e.g., base station, satellite, etc.) that may include a network device where timing alignment of UL and DL frames may be observed. For example, an RP may operate by measuring the time difference between physical uplink shared channel (PUSCH) communications, physical uplink control channel (PUCCH) communications, and sounding reference signal (SRS) communications, and corresponding subframe to measure or determine alignment and/or derive appropriate TA value adjustments. In scenarios involving a transparent satellite, the RP for determining propagation delay may be the base station. By contrast, in scenarios involving a regenerative satellite, the RP for determining propagation delay may be the satellite. In such scenarios, propagation delays between the regenerative satellite and base station may be monitored, detected, and addressed by the network (e.g., without involvement of the UE).

Wireless communication networks may implement techniques to help ensure proper timing and synchronization of wireless transmissions. An example of such a technique may include the use of timing advance (TA) values for UL transmissions, whereby a UE may address signal propagation delays by modifying UL transmission times based on a TA value so that the signals arrive at the network at the proper time (e.g., in accordance with a frame structure implemented by the base station, satellite, etc.). For an initial UL transmission (e.g., of a random access channel (RACH) procedure), the UE may determine an initial TA value based on one or more of a UE-specific differential TA (or UE-specific TA) and/or a common TA. For UEs communicating via satellite, a UE-specific differential TA may include a value corresponding to a signal propagation delay between the UE and the satellite, and the UE may determine the UE-specific TA based on information such as, a location of the UE, global navigation satellite system (GNSS) capabilities of the UE, satellite ephemeris information, time stamp information, etc. A common TA may include a value corresponding to a signal propagation delay between the satellite and the base station, which may be determined by the network on a per satellite or coverage area basis and/or broadcasted to UEs in the coverage area.

As the distances and propagation delays between the UE and the satellite and/or base station may vary over time, the techniques described herein enable TA values to be appropriately maintained (e.g., modified and updated) to better ensure proper arrival times of UL transmissions. For example, after determining the initial TA value described above, the UE may receive a message (e.g., a random access channel (RACH) response (RAR), a media access control (MAC) control element (CE), etc.) that causes the UE to update the TA value based on the message. Additionally, or alternatively, the network may communicate a new or updated common TA and/or a UE-specific TA, which the UE may use to update the TA value for subsequent UL transmissions.

Techniques described herein also enable the UE to update TA values based on a timing drift rate value, which may correspond to a rate of change in signal propagation delays based on factors, such as velocities and trajectories of the UE and/or satellite. For example, the UE may determine a timing drift rate to apply to the TA value based on a common timing drift rate and/or a dedicated (or UE-specific) timing drift rate, which may be received from the network (e.g., in a MAC CE) or determined by the UE. A common timing drift rate may be broadcasted to UEs in a satellite coverage area or footprint and may correspond to a change in a distance between the satellite and base station given the velocity and trajectory of the satellite. The UE-specific timing drift rate may correspond to a change in a distance between the UE and the satellite given the relative velocity and trajectory of the satellite and UE. The UE may update the TA value based on the timing drift rate and a duration of time (such as the duration of time measured from the most recent TA value update or a most recent UL transmission). Additionally, or alternatively, the UE may update the TA value based on a timing trigger (e.g., per UL transmission, at scheduled intervals, continuously (e.g., according to real-time)), in response to a newly received common TA, UE-specific TA, in response to a message with instructions for updating the TA, etc.

The techniques described herein also include TA maintenance during beam switching. For example, the UE may update the TA value during beam switching since a TA value that is appropriate for one satellite may not be appropriate for another satellite. In some implementations, the UE may update the TA during beam switching based on receiving instructions (e.g., a MAC CE, transmission control indicator (TCI) state, etc.) from the network. TA information (e.g., common TA, UE-specific TA, TA command, etc.) may be an absolute value that UE may use to replace an old TA value or a differential (or relative) value that UE may use to modify the old TA value. Similarly, timing drift rate information (e.g., a common timing drift rate, UE-specific timing drift rate, etc.) may be an absolute rate or value that UE may use to replace an old timing drift rate or a differential (or relative) rate that UE may use to modify the old timing drift rate. As such, techniques described herein include several approaches to enabling TA maintenance in an NTN, which may be implemented in isolation or in any variety of combination, to better ensure proper transmission timing and synchronization within the NTN.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3nd generation (3G), 4nd generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like.

As shown, UE 110 may also, or alternatively, connect to access point (AP) 116 via interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable the connections 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.).

RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 120 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally or alternatively, one or more of RAN nodes 120 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle radio resource control (RRC) and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system 100 is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to an secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers (as) 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application server 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2). Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
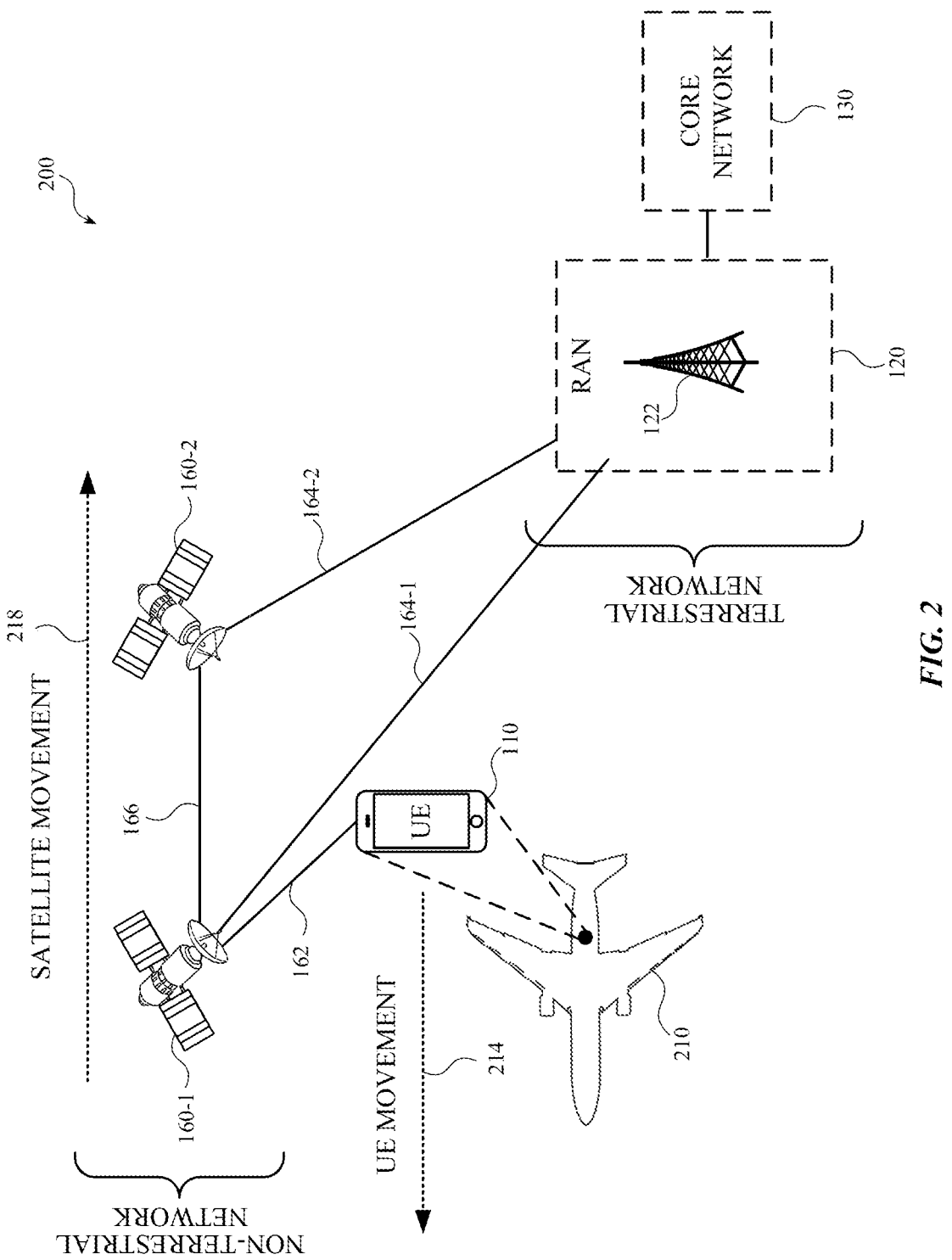
FIG. 2 is a diagram of example dynamics relating to time advance (TA) maintenance in a non-terrestrial network (NTN).

FIG. 2 is a diagram of example dynamics relating to time advance (TA) maintenance in an NTN. As shown, UE 110 may be connected to satellite 160-1, and satellite 160-1 may be connected to RAN 120. UE 110 may be located on airplane 210, a highspeed train, or another type high-velocity transportation system.

Prior to departure of airplane 210, UE 110 may be stationary, and therefore UE 110 may determine a TA value based on a common TA value broadcasted to all UEs 110 in the coverage area and/or a TA value received by UE 110 as part of a RACH attachment procedure. UE 110 may also receive a drift rate information that corresponds to changes in propagation delays between UE 110 and satellite 160-1 and/or between RAN node 120 and satellite 160-1 due to the velocity of satellite 160-1 moving in direction 180. While UE 110 remains stationary in airplane 210, UE 110 may update UL timing transmissions by determining new TA values based on the drift rate information, thereby accounting for changes in propagation delay resulting from a change in distances between UE 110 and satellite 160-1 and/or between RAN node 120 and satellite 160-1. In some implementation, UE 110 may also, or alternatively, update UL timing transmission based on one or more other types of information, such as a newly broadcasted common TA, a MAC CE that includes a TA command from the network, newly received drift rate information, etc.

At some point, airplane 210 may begin flying in direction 214, which may be opposite to direction 218 of satellites 160. As such, a distance between UE 110 and satellites 160 may increase at a rate based on the combined velocities of airplane 210 and satellites 160. In such a scenario, UE 110 may update the timing drift rate, used to determine TA values, to accurately represent the velocity and trajectory of UE 110 relative to satellite 160-1. In some implementations, UE 110 may update the timing drift rate based on a MAC CE received from the network, an RRC message, a downlink control indicator (DCI), etc. UE 110 may update UL timing transmissions by determining a new TA value based on the updated timing drift rate information to better ensure proper synchronization of transmissions within the network.

FIG. 3 is a flowchart of an example process 300 for TA maintenance in an NTN. Process 300 may be implemented by UE 110. In some implementations, some or all of process 300 may be performed by one or more other systems or devices, including one or more of the devices of FIG. 1. Additionally, process 300 may include one or more fewer, additional, differently ordered and/or arranged operations than those shown in FIG. 3. Furthermore, as FIG. 3 and the corresponding description discuss an example process 300 for TA maintenance that may be performed by UE 110, the scope of the techniques described herein include corresponding processes that may performed by a corresponding base station (e.g., RAN node 112), satellite, and/or other network device described in reference to FIG. 1.

As shown, process 300 may include receiving a common TA and/or common timing drift rate from an NTN (block 310). For example, UE 110 may receive common TA from satellite 160 connected to a base station (e.g., RAN node 112). The common TA may correspond to a propagation delay between the base station and satellite 160. In some implementations, the base station may determine the common TA on a per-satellite basis (e.g., by determining a proper common TA for each satellite connected to the base station) and may communicate the common TA to satellite 160. The satellite may broadcast the common TA to UEs 110 within a coverage area of satellite 160.

Additionally, or alternatively, the base station may determine a common timing drift rate corresponding to a change in a distance (over time) between the base station and satellite 160. In such implementations, the base station may communicate the common timing drift rate to satellite 160, and satellite 160 may broadcast the common timing drift rate to UE 110, which may be in the same broad cast as the common TA or a different broadcast. In some implementations, the common timing drift rate may be determined by satellite 160. In some implementations, such as when the satellite operates regeneratively, the satellite may not broadcast a common TA or common timing drift rate, or the value of the common TA and common timing drift rate may be zero (0). In some implementations, the common timing drift rate may vary based on a relative orbital direction and altitude of the corresponding satellite, and may be indicated (e.g., in a RAR, MAC CE, etc.) by one or more bit values, such as a bit value indicating a micro-second per second (y) and/or a scaling factor (S), such that UE 110 may determine the common timing drift rate (x) as: x=y*S.

Process 300 may also include determining a UE-specific TA (block 320). For example, UE 110 may communicate with satellite 160 to determine a location of UE 110, timestamp information, satellite ephemeris information (e.g., a location of the satellite, velocity, orbital trajectory, etc.), etc., and may use the information to determine a UE-specific TA. In some implementations, the UE-specific TA may correspond to a signal propagation delay between UE 110 and satellite 160.

Process 300 may include determining a TA value based on the common TA, the common timing drift rate, and/or the UE-specific TA (block 330). For example, UE 110 may initially designate the TA value for UL transmissions as based on the common TA and UE-specific TA, and over time, UE 110 may modify the TA value based on the common timing drift rate. Since the common TA may correspond to a propagation delay between the satellite and base station, the common timing drift rate may correspond to a change in in propagation delay between satellite 160 and the base station, and the UE-specific TA may account for a change in propagation delay between UE 110 and satellite 160, the resulting TA value may be used by UE 110 to communicate with the base station with appropriate transmission times. In some implementations, for example, UE 110 may use the TA value to transmit a physical RACH (PRACH) preamble (RACH, Msg1) to the base station to register and establish a connection with the network.

Process 300 may also include receiving a TA command from NTN and updating the TA value based on the TA command (block 350). For instance, UE 110 may receive a TA command from satellite 160 and update the TA value based on the TA command. In some implementations, the TA command may be received in a RAR message (e.g., Msg2) of a RACH procedure, and UE 110 may modify that old TA based on the TA command for subsequent UL transmissions (e.g., to complete the RACH procedure). In other scenarios, the TA command may be part of a MAC CE sent to UE 110 after the RACH procedure. For example, the TA command may be received in response to, and/or in combination with, a particular trigger or event, such as a beam switching event. As such, the network may be capable of causing UE 110 to update the TA value by communicating a TA command to UE 110 during the RACH procedure and/or at some point thereafter.

While not shown in FIG. 3, UE 110 may also, or alternatively, receive an updated common TA from the NTN. For example, the base station may determine that a different common TA is to be broadcast to UEs 110 within the coverage range of satellite 160. In some implementations, this may be the result of a change in distance and/or propagation delay between satellite 160 and the base station. In such implementations, UE 110 may receive the updated common TA and modify the old TA with the new common TA. Similarly, UE 110 may receive an updated common timing drift rate (e.g., via a network broadcast) and determine TA values for UL transmissions base on the updated common timing drift rate. Depending on the implementation, UE 110 UE 110 may update a TA value (e.g., in response to receiving a RAR with TA information, MAC CE with a TA command, etc.) using the most recently received common TA, the next common TA to be received, or a combination of the most recently received common TA and the next common TA, Process 300 may also include obtaining a UE-specific (or dedicated) drift rate and updating the TA value based the UE-specific timing drift rate (block 360). For instance, UE 110 may receive a UE-specific timing drift rate from the base station, and/or may update TA values based on the UE-specific timing drift rate. If/when UE 110 is on an airplane, high-speed train, and/or is otherwise traveling at a high velocity, the network may determine that the velocity and trajectory of UE 110 may adversely affect (e.g., unsynchronized) UL transmissions from UE 110. In such scenarios, the base station may determine a UE-specific timing drift rate for UE 110, which may include a rate at which a propagation delay between UE 110 and satellite 160 may change, and may communicate the UE-specific timing drift rate to UE 110 (e.g., in a MAC CE, RRC message, DCI, etc.). UE 110 may use the UE-specific timing drift rate to modify the TA value in one or more ways, such as replacing a current timing drift rate, modifying the current timing drift rate, etc. As such, the techniques described herein may enable TA maintenance to use, or take into account, a timing drift rate that is specific to UE 110. In some implementation, a common timing drift rate and/or UE-specific timing drift rate may be used to replace (as an absolute value) or modify (as a relative value) a timing drift rate used by UE 110 for UL transmissions. Additionally, the UE-specific timing drift rate may be determined and/or represented as a bit value indicating a micro-second per second (y) and/or a scaling factor (S), such that UE 110 may determine the UE-specific timing drift rate (x) as: x=y*S Process 300 may also include receiving a joint TA command and timing drift rate and updating the TA value based on the joint TA command and timing drift rate (block 370). For example, UE 110 may receive a joint TA command and timing drift rate from satellite 160. A joint TA command and timing drift rate may include a message (e.g., a MAC CE) that includes both a TA command and a timing drift rate. The timing drift rate may include a common timing drift rate, UE-specific timing drift rate, or a combination thereof. In response, UE 110 may use the TA command of the joint message to update the TA value and may apply the timing drift rate of the joint message to the old timing drift rate used by UE 110. As such, the techniques described herein may enable TA maintenance to include message from the network that include different types of information (e.g., a TA command and timing drift rate) that UE 110 may use to update the TA values.

Figure 4:
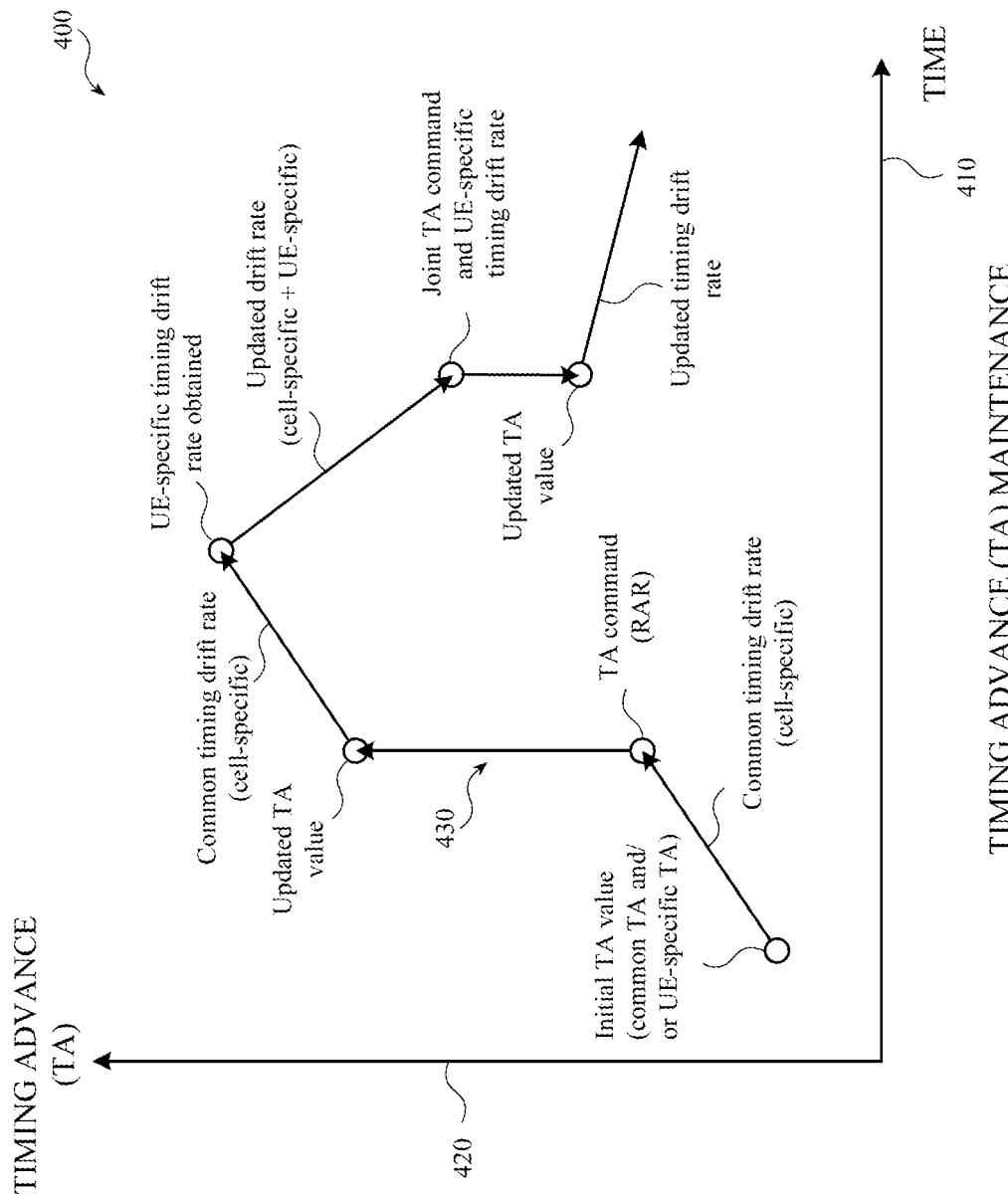
FIG. 4 is a table of an example of changes in a TA value during TA maintenance.

FIG. 4 is a table of an example 400 of changes in a TA value during TA maintenance. As shown, the table of FIG. 4 may include a horizontal axis 410 representing time, a vertical axis 420 representing TA value, and a line representing changes in a TA value relative to time. In some implementations, example 400 may correspond to changes in a TA value of UE 110.

UE 110 may determine an initial TA value based on a common TA broadcasted by the network and/or a UE-specific TA determined by UE 110. UE 110 may also receive a common, or cell-specific, timing drift rate broadcasted by the network and may modify the initial TA value over time by applying a timing drift rate to the initial TA value. The common timing drift rate may be received before, after, or in combination with the initial TA value. As shown, the timing drift rate may be a positive value, resulting in an increase in the TA value over time (e.g., when a propagation delay between satellite 160 and base station is increasing). In other implementations, the common timing drift rate may be negative (e.g., when a propagation delay between satellite 160 and base station is decreasing).

At some point, UE 110 may receive a TA command from RAN 120. The TA command may be part of a RAR or MAC CE, and/or may include the TA command that UE 110 may use to replace or otherwise update the TA value used by UE 110 (e.g., the initial TA value modified by the timing drift rate). As shown, the TA command may include a positive value that may cause an increase in the TA value. In some implementations, the TA command may include a negative value that may cause a decrease in the TA value (e.g., if the real-time delay (RTD) between a RP and satellite is larger than the RTD between the RP and UE and satellite). Whether a TA command includes a positive or negative value may be indicated at a bit (1 or 0) of the message (e.g., RAR, MAC CE, etc. containing the value). As shown, UE 110 may continue modifying the TA value over time based on the timing drift rate (e.g., the cell-specific timing drift rate). The bit indicating a positive or negative RAR message or TA command may be located immediately before or after a timing advance field (e.g., TA command) of a RAR, MAC CE, etc.

At some point, UE 110 may receive a new timing drift rate from RAN 120. The new timing drift rate may part of a MAC CE and/or may include a dedicated, or UE-specific, timing drift rate, and may be a positive or negative rate value. UE 110 may use the new timing drift rate to replace or update the old timing drift rate (e.g., the cell-specific timing drift rate) and may apply the updated timing drift rate to the TA value over time. As shown, UE 110 may receive a message (e.g., a MAC CE) from RAN 120 that includes both a TA command and a new timing drift rate, depicted in example 400 as a joint TA command and UE-specific timing drift rate. UE 110 may update or replace the old TA value based on the TA command of the joint message.

As depicted, the TA command may include a negative value, resulting in a decrease in the TA value used by UE 110 for UL transmissions. UE 110 may also, or alternatively, replace or modify the old the timing drift rate based on the new timing drift rate value of the joint message, and UE 110 may use the newly updated timing drift rate to modify the TA value over time.

Figure 5:
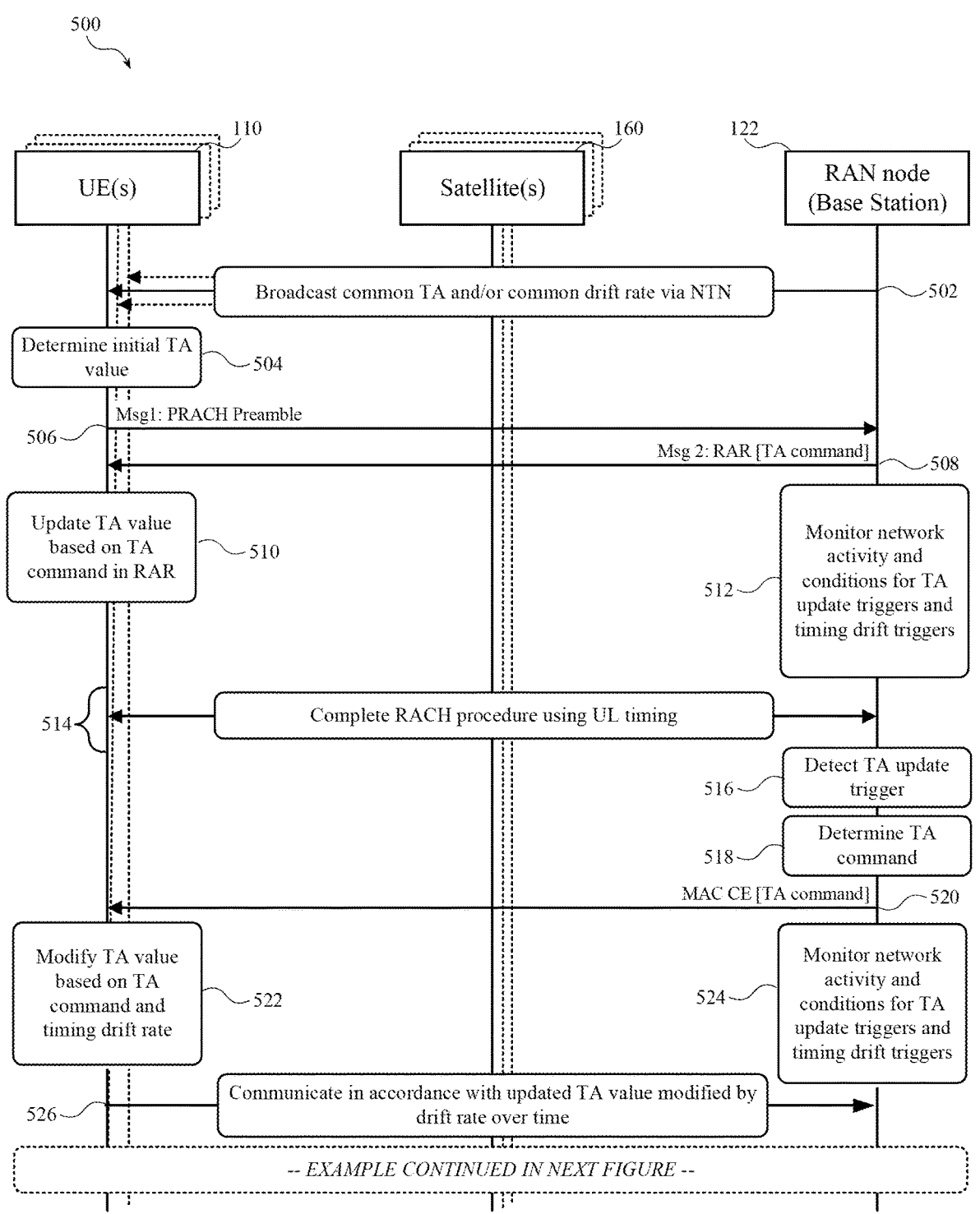
FIGS. 5-7 are sequence diagrams of an example process for TA maintenance.
Figure 6:
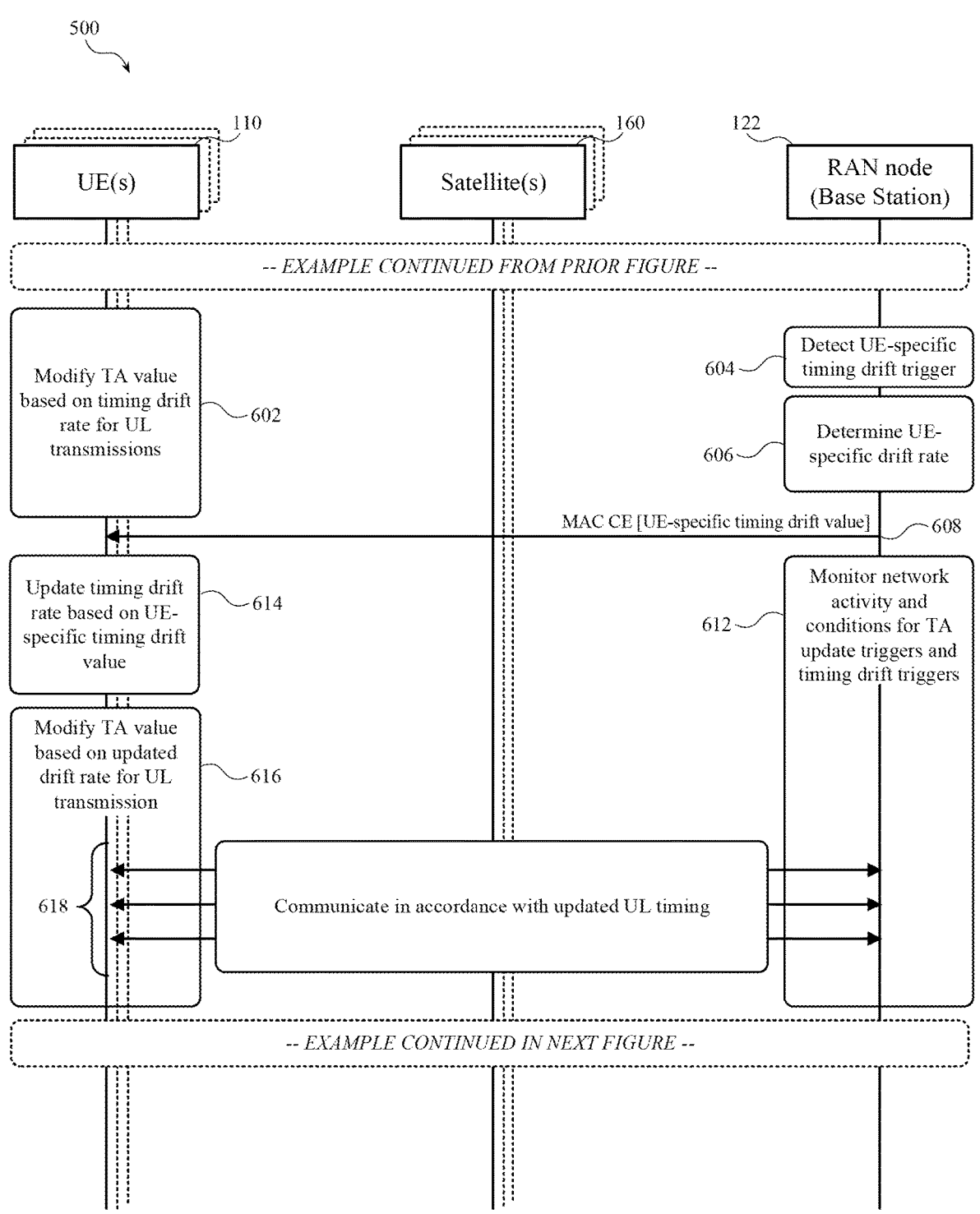
Figure 7:
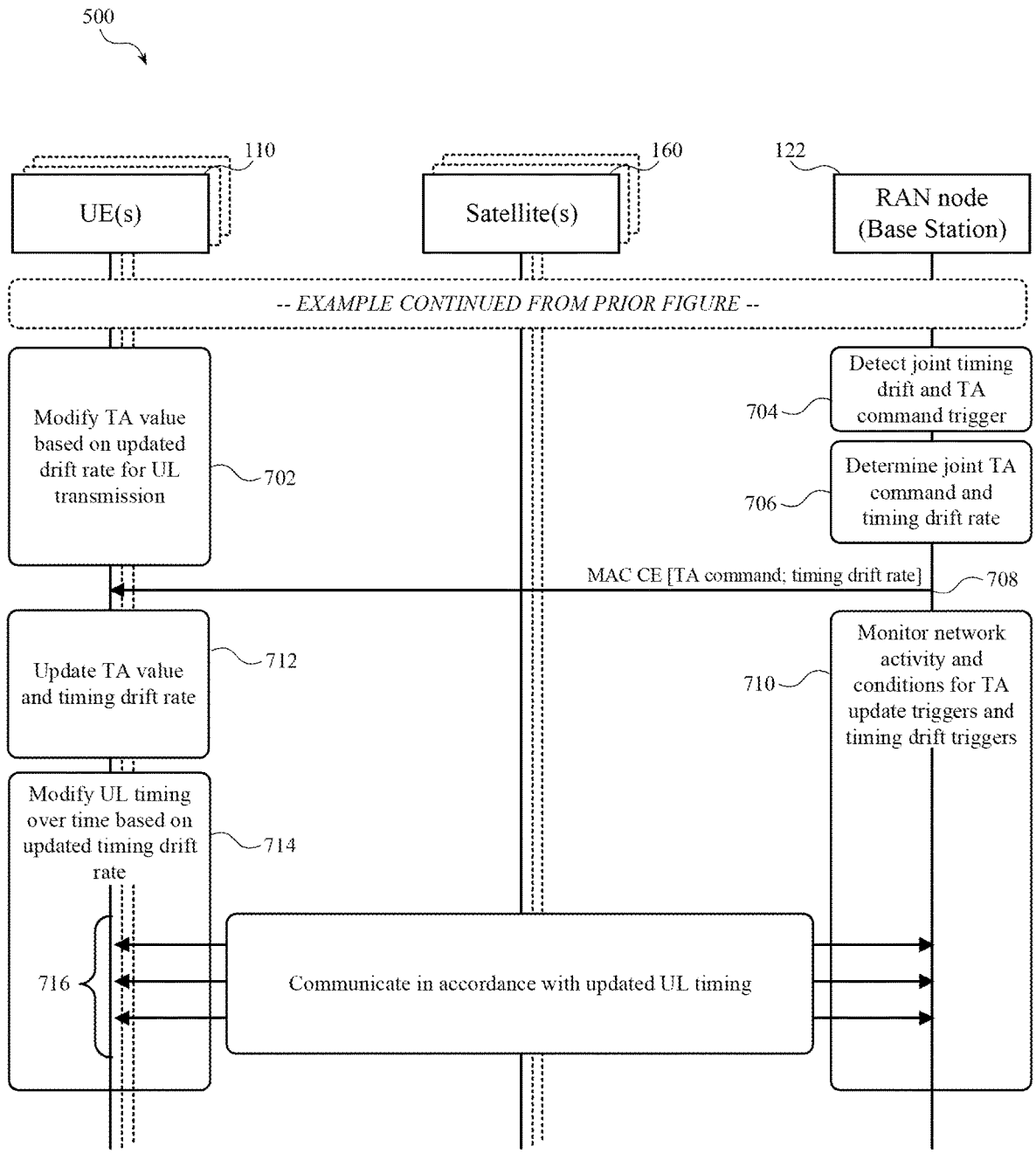

FIGS. 5-7 are sequence diagrams of an example process 500 for TA maintenance. As shown, example process 500 may involve UE 110, satellite 160, and base station 122 (also referred to herein as RAN node 122). In some implementations, example process 500 may include one or more additional, alternative, fewer, or differently arranged operations, and/or devices, than those shown in FIGS. 5-7. Additionally, while the operations of FIGS. 5-7 are depicted as being performed by UE 110, satellite 160, or base station 122, in some implementations, one or more of the operations may be performed by another device, or combination of devices, of a wireless communication network. For example, in some implementations, one or more of operations performed by base station 122 may be performed by satellite 160.

As shown, base station 122 may cause satellite 160 to broadcast a common TA and/or common timing drift rate to UEs 110 in a coverage area of footprint of satellite 160 (at 504). In response, UE 110 may obtain the common TA and/or common timing drift rate and determine an initial TA value based on the common TA and/or common timing drift rate (at 504). UE 110 may use the TA value to modify the transmission time of a PRACH preamble message sent to base station 122 (at 506), and base station 122 may respond with a RAR message to UE 110 (at 508). As shown, the RAR message may include a TA command. The base station may determine the TA command based on a reception time on the PRACH preamble message (e.g., based on whether the PRACH preamble was received too early or two late).

UE 110 may update the old TA value (e.g., used to send the PRACH preamble) with the TA command in the RAR (at 510). Meanwhile, base station 122 may monitor network activity and conditions for TA update triggers and/or drift rate triggers (at 512). As described herein, a TA update trigger may include a scenario in which the network determines that UEs 110 in a particular coverage area should adjust UL transmission times, such as when a satellite previously transmitting to the coverage area moves away from the coverage area and/or a new satellite rotates into the coverage area. Additionally, or alternatively, a timing drift trigger may include a scenario in which base station 122 determines that a velocity and trajectory of a particular UE 110, possibly with respect to a velocity and trajectory of satellite 160, is such that UE 112 may require a UE-specific timing drift rate to remain synchronized with the network.

For the purposes of FIG. 5, assume that base station 122 does not determine that the TA value or timing drift rate of UE 110 should be modified, such that UE 110 and base station 122 may complete the RACH procedure (at 514). UL transmissions by UE 110 may be communicated in accordance with the most recent TA value modified by the timing drift rate stored by UE 110. As shown, base station 122 may later detect a TA update trigger (at 516) (e.g., such as a change in satellites 160 regarding a coverage area of UE 110). Base station 122 may respond by determining a TA command associated with the trigger (at 518) and may communicate the TA command in a MAC CE (at 520). UE 110 may receive the MAC CE and modify the old TA value based on the newly received TA command (at 522). Meanwhile, base station 122 may continue monitoring network activity and conditions for TA update triggers and/or drift rate triggers (at 524), and UE 522 may use the updated TA value, modified by the timing drift rate over time, for UL transmissions to base station 122.

Referring to FIG. 6, UE 110 may continue modifying the TA value for UL transmissions based on the timing drift rate stored by UE 110 (at 602). At some point, base station 122 may detect a UE-specific timing drift rate trigger (at 604). For example, UE 110 may be on an airplane, high-speed train, or otherwise moving at a high rate of speed. Base station 122 (and/or satellite 160) may monitor movements of UE 110 and determine a velocity and trajectory based on the movements of UE 110. When the velocity and/or trajectory of UE 110 exceed a specified range or threshold, base station 122 may determine that a UE-specific timing drift rate is to be determined and communicated to UE 110 (at 606). In some implementations, base station 122, and/or satellite 160, may be configured to determine and/or communicate a UE-specific timing drift rate to UE 110 based on one or more other types of criteria or trigger.

Base station 122 may communicate the UE-specific timing drift rate via a MAC CE (at 608), which may be the same type, or a different type, of MAC CE used to communicate a TA command (see, e.g., 522). In some implementations, base station 122 may communicate the UE-specific timing drift rate in one or more other types of messages, such as in a dedicated RRC message or configuration, a DCI, etc. Additionally, base station 122 may continue monitoring network activity and conditions for TA update triggers and/or drift rate triggers (at 612). In some implementations, a UE-specific timing drift rate may be performed autonomously by UE 110 based on ephemeris satellite information, timestamp information, a measured velocity of UE 110, etc. UE 110 may modify or update the timing drift rate being applied to the TA value, which may be based on the common (or cell-specific) drift rate received previously (see, e.g., 502), based on the UE-specific timing drift rate (at 614). UE 110 may send UL transmissions to base station 122 based on the TA value as modified by the newly updated timing drift rate (at 616 and 618), and base station 122 may continue monitoring the transmissions for proper synchronization.

Referring to FIG. 7, UE 110 may continue modifying the TA value for UL transmissions based on the timing drift rate stored by UE 110 (at 702). At some point, base station 122 may detect a trigger, event, condition, etc., associated with sending a joint TA command and timing drift rate to UE 110. In some implementations, this may include a changes in the location of satellite 160, a beam switching event, and/or another type of scenario in which a TA value of UE 110 is to be updated to ensure proper transmission timing and synchronization between UE 110, satellite 160, and or base station 120. The TA command may include a common TA command (e.g., based on changes between base station 120 and satellite 160) and/or a UE-specific TA command (e.g., based on changes between UE 110 and satellite 160).

Additionally, in response to detecting the trigger, base station 120 may determine appropriate the values (e.g., based on the conditions detected) for the joint TA command and timing drift rate (at 706), and base station 120 may communicate the joint TA command and timing drift rate to UE 110 via a MAC CE (at 708), which may be the same, or different, from a MAC CE used to communicate the TA command (see, e.g., 522) and/or the UE-specific timing drift rate (see, e.g., 608). In some implementations, base station 122 may communicate the joint TA command and timing drift rate in one or more other types of signals or messages, such as in a dedicated RRC message or configuration, a downlink control indicator (DCI), etc. Additionally, base station 122 may continue monitoring network activity and conditions for TA update triggers and/or drift rate triggers (at 710). UE 110 may modify or update the TA value based on the TA command and/or update the current timing drift rate with the newly received drift rate from base station 122 (at 712). Additionally, UE 110 may send UL transmissions to base station 122 based on the TA value as modified by the newly updated timing drift rate over time (at 714 and 716), which base station 122 may continue monitoring the transmission for proper synchronization.

Figure 8:
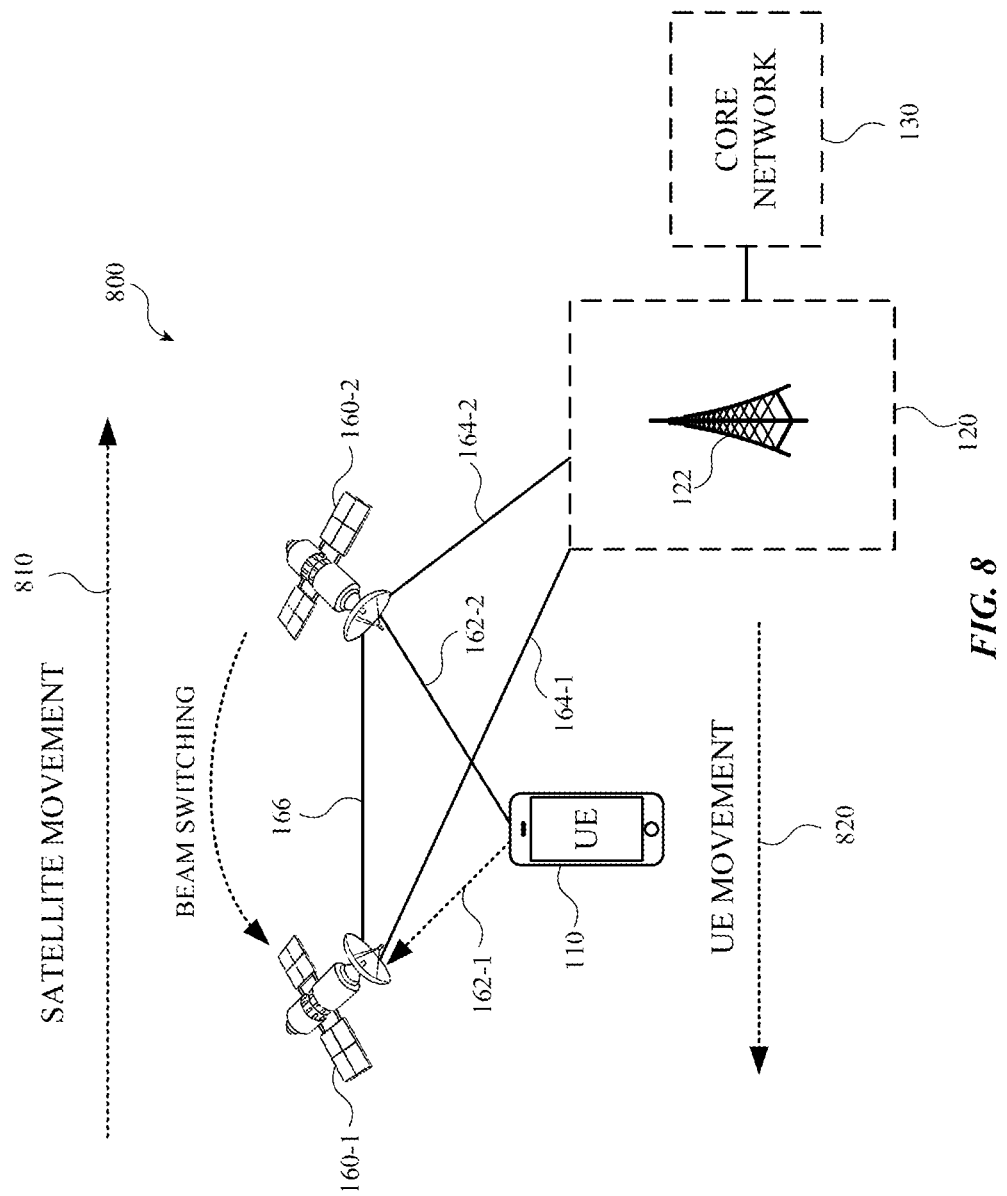
FIG. 8 is a diagram of an example of TA maintenance during beam switching.

FIG. 8 is a diagram of an example 800 of TA maintenance during beam switching. As shown, example 800 may include UE 110, RAN 120, RAN node (base station) 122, CN 130, satellite 160-1, and satellite 160-2 (collectively, satellites 160). Example 800 also includes various interfaces (e.g., 162, 164, 166, etc.) that are described above with reference to FIG. 1.

As shown, UE 110 may be connected to RAN 120 via satellite 160-2 and may be communicating with satellite 160-2 in accordance with a TA value maintained by UE 110. Examples of UE 110 maintaining the TA value are described throughout this specification. Satellites 160 may be moving in direction 810 based on an orbital trajectory of the satellites, and UE 110 may be moving in direction 820, contrary to direction 810. In time, the movements of UE 110 and/or satellites 160 may prompt a beam switching procedure in the network, whereby UE 110 may remain connected to the network while switching connections beams from satellite 160-2 to satellite 160-1. Operations of the beam switching procedure may be consistent with a wireless communication standard implemented by the network, such as the 5G communication standard of the 3GPP. In some implementations, when satellite 160-2 and satellite 160-1 are part of the same cell (e.g., the same logical cell), beam switching may occur during serving satellite switching.

Additionally, since the TA value that is appropriate for UE 110 to use in communicating with satellite 160-2 may be different from the TA value that is appropriate for UE 110 to use in communicating with satellite 160-2, techniques described herein may include processes and procedures whereby a TA value of UE 110 may be maintained and appropriately updated during the beam switching procedure. In some implementations, UE 110 may autonomously update the TA value based a common TA and/or common timing drift rate associated with satellite 160-1 (e.g., received via a broadcasted signal from satellite 160-1). Additionally, or alternatively, UE 110 may obtain a UE-specific TA based on, for example, a position of UE 110 and satellite information of satellite 160-1. UE 110 may use the common TA, common timing drift rate, and/or UE-specific TA to determine an appropriate TA value for communicating with satellite 160-1.

Additionally, or alternatively, the network may provide UE 110 with a MAC CE indicating a new TCI state for a UE-specific PDCCH, and the MAC CE may indicate a value that UE is to use in communicating with satellite 160-1. The value may include the TA value (that may replace an old TA value) or a TA differential value that may be used to update an old TA. In some implementations, the network may provide UE 110 with a MAC CE indicating a new TCI state for a UE-specific PDCCH, and the MAC CE may include instructions that cause UE 110 to determine or update a TA value or communicating with satellite 160-1. In such a scenario, UE 110 may respond by determining the TA value based on one or more of the operations described herein (e.g., determining the TA for satellite 160-1 based on one or more of a common TA, common timing drift rate, autonomously determined UE-specific timing drift rate, TA command, UE-specific timing drift rate from the network, etc.). In yet other implementations, the TCI state may be configured or arranged, such that the TA value or TA differential value for communicating with satellite 160-1 is included in the TCI state itself. For example, the TCI state for the beam switching procedure may include TCI-State::=sequence{tci-StateId, qc1-Type1, qcl-Type2, TA}. To obtain the TA value, base station 122 may either signal directly the TA value in the above descriptions or signal the ephemeris information of satellite 160-1 so that UE 110 may derive the TA value based on the signaled ephemeris information and UE's GNSS location information. It is possible that both the TA value and ephemeris information are signaled. During the beam switching procedure involving two different satellites, base station may indicate a bandwidth part (BWP) used by satellite 160-1 to cover the area of UE 110. The signaling of the BWP may be jointly, or separately, from the signaling of TA value.

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

Figure 9:
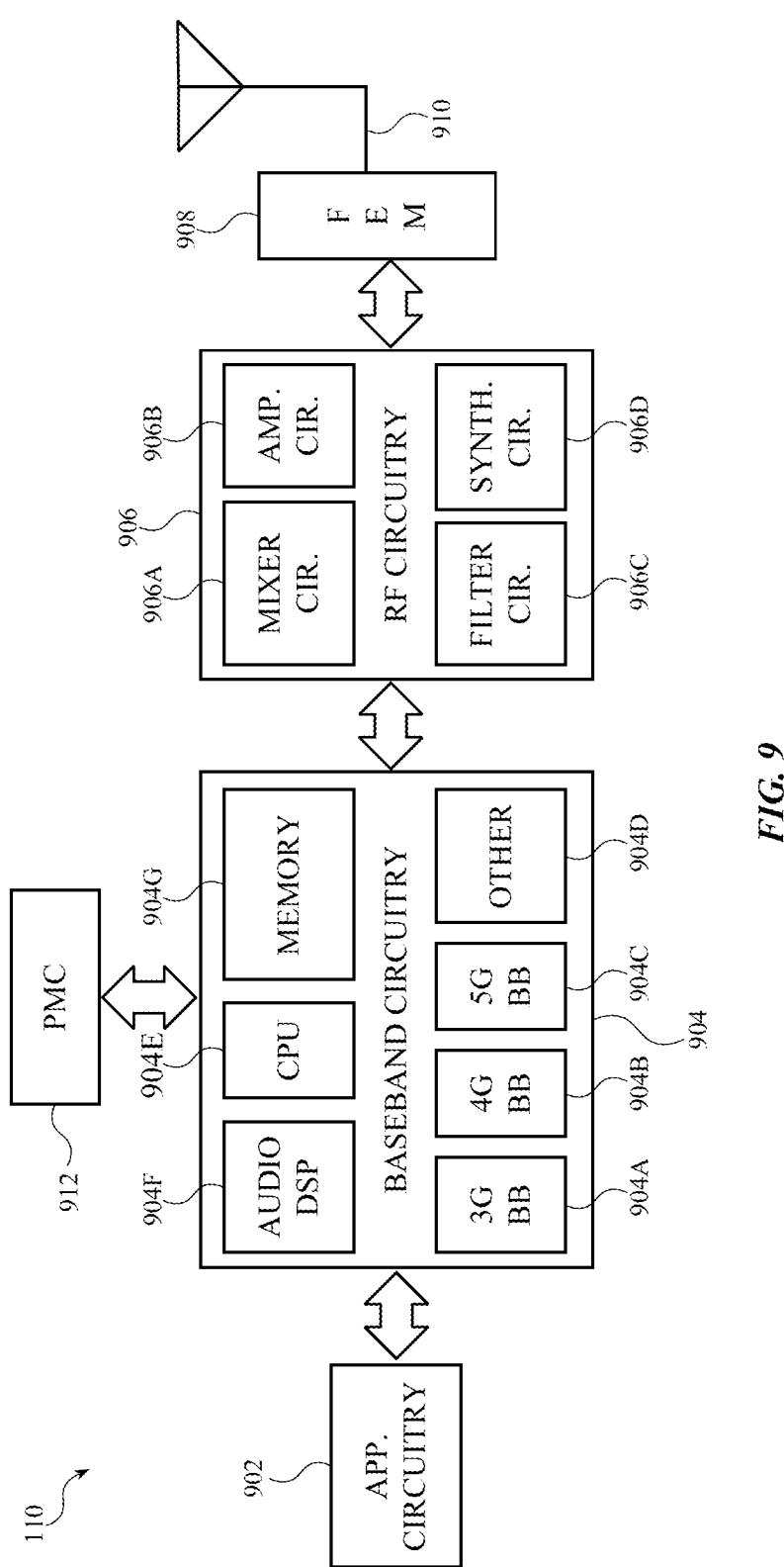
FIG. 9 is a diagram of an example of components of a device according to one or more implementations described herein.

FIG. 9 is a diagram of an example of components of a device according to one or more implementations described herein. In some implementations, the device 900 can include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 can be included in a UE or a RAN node. In some implementations, the device 900 can include fewer elements (e.g., a RAN node may not utilize application circuitry 902, and instead include a processor/controller to process IP data received from a CN such as 5GC 130 or an Evolved Packet Core (EPC)). In some implementations, the device 900 can include additional elements such as, for example, memory/storage, display, camera, sensor (including one or more temperature sensors, such as a single temperature sensor, a plurality of temperature sensors at different locations in device 900, etc.), or input/output (I/O) interface. In other implementations, the components described below can be included in more than one device (e.g., said circuitries can be separately included in more than one device for Cloud-RAN (C-RAN) implementations).

The application circuitry 902 can include one or more application processors. For example, the application circuitry 902 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 900. In some implementations, processors of application circuitry 902 can process IP data packets received from an EPC.

The baseband circuitry 904 can include circuitry such as, but not limited to, one or more single-core or multi-core processors. The baseband circuitry 904 can include one or more baseband processors or control logic to process baseband signals received from a receive signal path of the RF circuitry 906 and to generate baseband signals for a transmit signal path of the RF circuitry 906. Baseband circuitry 904 can interface with the application circuitry 902 for generation and processing of the baseband signals and for controlling operations of the RF circuitry 906. For example, in some implementations, the baseband circuitry 904 can include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 904 (e.g., one or more of baseband processors 904A-D) can handle various radio control functions that enable communication with one or more radio networks via the RF circuitry 906. In other implementations, some or all of the functionality of baseband processors 904A-D can be included in modules stored in the memory 904G and executed via a Central Processing Unit (CPU) 904E. The radio control functions can include, but are not limited to, signal modulation/demodulation, encoding/decoding, radio frequency shifting, etc. In some implementations, modulation/demodulation circuitry of the baseband circuitry 904 can include Fast-Fourier Transform (FFT), precoding, or constellation mapping/demapping functionality. In some implementations, encoding/decoding circuitry of the baseband circuitry 904 can include convolution, tail-biting convolution, turbo, Viterbi, or Low Density Parity Check (LDPC) encoder/decoder functionality. Implementations of modulation/demodulation and encoder/decoder functionality are not limited to these examples and can include other suitable functionality in other implementations.

In some implementations, the baseband circuitry 904 can include one or more audio digital signal processor(s) (DSP) 904F. The audio DSP(s) 904F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 904 and the application circuitry 902 can be implemented together such as, for example, on a system on a chip (SOC).

In some implementations, the baseband circuitry 904 can provide for communication compatible with one or more radio technologies. For example, in some implementations, the baseband circuitry 904 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 904 is configured to support radio communications of more than one wireless protocol can be referred to as multi-mode baseband circuitry.

RF circuitry 906 can enable communication with wireless networks using modulated electromagnetic radiation through a non-solid medium. In various implementations, the RF circuitry 906 can include switches, filters, amplifiers, etc. to facilitate the communication with the wireless network. RF circuitry 906 can include a receive signal path which can include circuitry to down-convert RF signals received from the FEM circuitry 908 and provide baseband signals to the baseband circuitry 904. RF circuitry 906 can also include a transmit signal path which can include circuitry to up-convert baseband signals provided by the baseband circuitry 904 and provide RF output signals to the FEM circuitry 908 for transmission.

In some implementations, the receive signal path of the RF circuitry 906 can include mixer circuitry 906a, amplifier circuitry 906b and filter circuitry 906c. In some implementations, the transmit signal path of the RF circuitry 906 can include filter circuitry 906c and mixer circuitry 906a. RF circuitry 906 can also include synthesizer circuitry 906d for synthesizing a frequency for use by the mixer circuitry 906a of the receive signal path and the transmit signal path. In some implementations, the mixer circuitry 906a of the receive signal path can be configured to down-convert RF signals received from the FEM circuitry 908 based on the synthesized frequency provided by synthesizer circuitry 906d. The amplifier circuitry 906b can be configured to amplify the down-converted signals and the filter circuitry 906c can be a low-pass filter (LPF) or band-pass filter (BPF) configured to remove unwanted signals from the down-converted signals to generate output baseband signals. Output baseband signals can be provided to the baseband circuitry 904 for further processing. In some implementations, the output baseband signals can be zero-frequency baseband signals, although this is not a requirement. In some implementations, mixer circuitry 906a of the receive signal path can comprise passive mixers, although the scope of the implementations is not limited in this respect.

In some implementations, the mixer circuitry 906a of the transmit signal path can be configured to up-convert input baseband signals based on the synthesized frequency provided by the synthesizer circuitry 906d to generate RF output signals for the FEM circuitry 908. The baseband signals can be provided by the baseband circuitry 904 and can be filtered by filter circuitry 906c.

In some implementations, the mixer circuitry 906a of the receive signal path and the mixer circuitry 906a of the transmit signal path can include two or more mixers and can be arranged for quadrature downconversion and upconversion, respectively. In some implementations, the mixer circuitry 906a of the receive signal path and the mixer circuitry 906a of the transmit signal path can include two or more mixers and can be arranged for image rejection (e.g., Hartley image rejection). In some implementations, the mixer circuitry 906a of the receive signal path and the mixer circuitry 906a can be arranged for direct downconversion and direct upconversion, respectively. In some implementations, the mixer circuitry 906a of the receive signal path and the mixer circuitry 906a of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 906 can include analog-to-digital converter (ADC) and digital-to-analog converter (DAC) circuitry and the baseband circuitry 904 can include a digital baseband interface to communicate with the RF circuitry 906.

In some dual-mode implementations, a separate radio IC circuitry can be provided for processing signals for each spectrum, although the scope of the implementations is not limited in this respect.

In some implementations, the synthesizer circuitry 906d can be a fractional-N synthesizer or a fractional N/N+1 synthesizer, although the scope of the implementations is not limited in this respect as other types of frequency synthesizers can be suitable. For example, synthesizer circuitry 906d can be a delta-sigma synthesizer, a frequency multiplier, or a synthesizer comprising a phase-locked loop with a frequency divider.

The synthesizer circuitry 906d can be configured to synthesize an output frequency for use by the mixer circuitry 906a of the RF circuitry 906 based on a frequency input and a divider control input. In some implementations, the synthesizer circuitry 906d can be a fractional N/N+1 synthesizer.

In some implementations, frequency input can be provided by a voltage controlled oscillator (VCO), although that is not a requirement. Divider control input can be provided by either the baseband circuitry 904 or the applications circuitry 902 depending on the desired output frequency. In some implementations, a divider control input (e.g., N) can be determined from a look-up table based on a channel indicated by the applications circuitry 902.

Synthesizer circuitry 906d of the RF circuitry 906 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 906d can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 906 can include an IQ/polar converter.

FEM circuitry 908 can include a receive signal path which can include circuitry configured to operate on RF signals received from one or more antennas 910, amplify the received signals and provide the amplified versions of the received signals to the RF circuitry 906 for further processing. FEM circuitry 908 can also include a transmit signal path which can include circuitry configured to amplify signals for transmission provided by the RF circuitry 906 for transmission by one or more of the one or more antennas 910. In various implementations, the amplification through the transmit or receive signal paths can be done solely in the RF circuitry 906, solely in the FEM circuitry 908, or in both the RF circuitry 906 and the FEM circuitry 908.

While FIG. 9 shows the PMC 912 coupled only with the baseband circuitry 904. However, in other implementations, the PMC 912 may be additionally or alternatively coupled with, and perform similar power management operations for, other components such as, but not limited to, application circuitry 902, RF circuitry 906, or FEM circuitry 908.

In some implementations, the FEM circuitry 908 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 906). The transmit signal path of the FEM circuitry 908 can include a power amplifier (PA) to amplify input RF signals (e.g., provided by RF circuitry 906), and one or more filters to generate RF signals for subsequent transmission (e.g., by one or more of the one or more antennas 910).

In some implementations, the PMC 912 can manage power provided to the baseband circuitry 904. In particular, the PMC 912 can control power-source selection, voltage scaling, battery charging, or DC-to-DC conversion. The PMC 912 can often be included when the device 900 is capable of being powered by a battery, for example, when the device is included in a UE. The PMC 912 can increase the power conversion efficiency while providing desirable implementation size and heat dissipation characteristics.

While FIG. 9 shows the PMC 912 coupled only with the baseband circuitry 904. However, in other implementations, the PMC 912 may be additionally or alternatively coupled with, and perform similar power management operations for, other components such as, but not limited to, application circuitry 902, RF circuitry 906, or FEM 908.

In some implementations, the PMC 912 can control, or otherwise be part of, various power saving mechanisms of the device 900. For example, if the device 900 is in an RRC_Connected state, where it is still connected to the RAN node as it expects to receive traffic shortly, then it can enter a state known as Discontinuous Reception Mode (DRX) after a period of inactivity. During this state, the device 900 can power down for brief intervals of time and thus save power.

If there is no data traffic activity for an extended period of time, then the device 900 can transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 902 and processors of the baseband circuitry 904 can be used to execute elements of one or more instances of a protocol stack. For example, processors of the baseband circuitry 904, alone or in combination, can be used execute Layer 3, Layer 2, or Layer 1 functionality, while processors of the application circuitry 902 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 10:
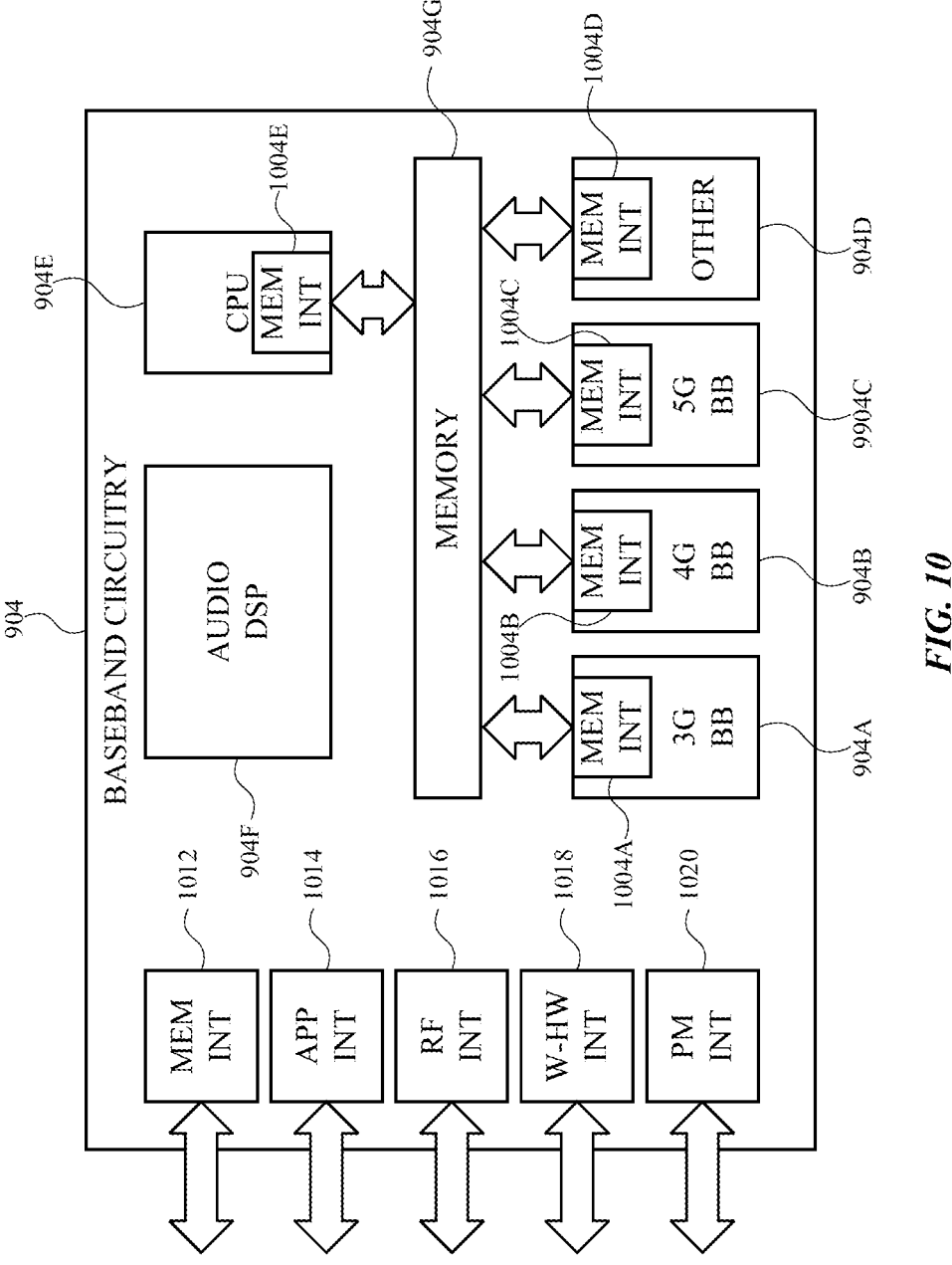
FIG. 10 is a diagram of example interfaces of baseband circuitry according to one or more implementations described herein.

FIG. 10 is a diagram of example interfaces of baseband circuitry according to one or more implementations described herein. As discussed above, the baseband circuitry 904 of FIG. 9 can comprise processors 904A-204E and a memory 904G utilized by said processors. Each of the processors 904A-204E can include a memory interface, 1004A-304E, respectively, to send/receive data to/from the memory 904G.

The baseband circuitry 904 can further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, a user Equipment (UE) device may comprise radio frequency (RF) circuitry configured to communicate with a wireless communication network comprising a non-terrestrial network (NTN) with a satellite, a memory device configured to store instructions; and one or more processors, connected to the RF circuitry and memory device, and configured to perform the instructions to: determine a timing advance (TA) value for modifying transmission times of uplink (UL) signals transmitted to the wireless communication network via the satellite; determine a timing drift rate associated with a change of a signal propagation delay of UL signals over time; and update the TA value based on the timing drift rate and a measured duration of time; and cause the RF circuitry to transmit UL signals in accordance with the TA value modified by the timing drift rate and a measured duration of time.

In example 2, the one or more processors is configured to determine the timing drift rate based on a common timing drift rate, broadcast to UEs in a coverage area associated with the satellite, and associated with a change of a signal propagation delay between the satellite and a base station of the wireless communication network. In example 3, the one or more processors is configured to determine the timing drift rate based on a UE-specific timing drift rate associated with a change of a signal propagation delay between the UE and the satellite. In example 4, the UE-specific timing drift rate is received from the NTN via one of: a radio resource control (RRC) communication; a media access control (MAC) control element (CE); or a downlink control indicator (DCI).

In example 5, the one or more processors is further configured to: update the timing drift rate based on a recently received timing drift rate from the NTN; and cause the RF circuitry to transmit UL signals based on the updated timing drift rate. In example 6, the one or more processors is configured to update the timing drift rate based on recently received timing drift rate by: replacing the timing drift rate with the recently received timing drift rate. In example 7, the one or more processors is configured to update the timing drift rate based on recently received timing drift rate by: combining the timing drift rate with the recently received timing drift rate. In example 8, the one or more processors is configured to update the TA value based on a timing drift rate information in a media access control (MAC) control element (CE).

In example 9, wherein the one or more processors is configured to update the TA value based on a TA information in a media access control (MAC) control element (CE). In example 10, the one or more processors is configured to update the TA value based on TA information and timing drift rate information received in a joint TA command and timing drift rate message. In example 11, the one or more processors is further configured to: update the TA value, or a bandwidth part (BWP), during a beam switching procedure involving an old serving satellite and a new serving satellite.

In example 12, the one or more processors is configured to update the TA value based on a common TA by determining an average of between the common TA and another common TA received previously from the NTN. In example 13, wherein the one or more processors is configured to determine the TA value based on: a common TA, received from the NTN via broadcast, and corresponding to a signal propagation delay between the satellite and the base station; and a UE-specific TA, determined by the UE, based on a location of the UE and ephemeris information of the satellite.

In example 14, a baseband (BB) circuitry, of a User Equipment (UE) device, may comprise one or more processors, connected to a RF circuitry interface and memory device, and configured to perform the instructions to: determine a timing advance (TA) value for modifying transmission times of uplink (UL) signals transmitted to the wireless communication network via the satellite; determine a timing drift rate associated with a change of a signal propagation delay of UL signals over time; and update the TA value based on the timing drift rate and a measured duration of time; and cause the RF circuitry to transmit UL signals in accordance with the TA value modified by the timing drift rate and a measured duration of time. In examples 15-26, the BB circuitry of example 14 being further modified by applying one or more, or any combination, of the device features of examples 2-14 as BB circuitry features of example 27.

In example 27, a User Equipment (UE) device, may comprise: means for determining a timing advance (TA) value for modifying transmission times of uplink (UL) signals transmitted to the wireless communication network via the satellite; means for determining a timing drift rate associated with a change of a signal propagation delay of UL signals over time; and means for updating the TA value based on the timing drift rate and a measured duration of time; and means for causing the RF circuitry to transmit UL signals in accordance with the TA value modified by the timing drift rate and a measured duration of time. In examples 28-39, the UE device of example 27 being further modified by applying one or more, or any combination, of the device features of examples 2-14 as means plus function features of example 27.

In example 40, a method, performed by a UE, may comprise: determining a timing advance (TA) value for modifying transmission times of uplink (UL) signals transmitted to the wireless communication network via the satellite; determining a timing drift rate associated with a change of a signal propagation delay of UL signals over time; and updating the TA value based on the timing drift rate and a measured duration of time; and causing the RF circuitry to transmit UL signals in accordance with the TA value modified by the timing drift rate and a measured duration of time. In examples 41-52, the method of example 40 being further modified by applying one or more, or any combination, of the device features of examples 2-14 as method features of example 40.

In example 53, a computer readable medium comprising instructions that when executed by a processor, cause the processor to: determine a timing advance (TA) value for modifying transmission times of uplink (UL) signals transmitted to the wireless communication network via the satellite; determine a timing drift rate associated with a change of a signal propagation delay of UL signals over time; and update the TA value based on the timing drift rate and a measured duration of time; and cause the RF circuitry to transmit UL signals in accordance with the TA value modified by the timing drift rate and a measured duration of time. In examples 54-65, the computer readable medium of example 53 being further modified by applying one or more, or any combination, of the device features of examples 2-14 as computer-readable medium features of example 53.

In example 54, a based station may comprise radio frequency (RF) circuitry configured to communicate with User Equipment (UEs) devices within a coverage area of a satellite of a non-terrestrial network (NTN); a memory device configured to store instructions; and one or more processors, connected to the RF circuitry and memory device, and configured to perform the instructions to: receive an uplink (UL) signal originating from a UE of the NTN; determine a timing drift rate for maintaining the TA over time based on a movement of the satellite of the NTN; and cause the timing drift rate to be communicated to the UE.

In example 55, the processor is further configured to: determine, based on the UL signal, a timing advance (TA) command for modifying transmission times of UL signals from the UE; and cause the TA command to be communicated to the UE. In example 56, the UL signal include a (RACH) preamble and the TA command is communicated to the UE via a random access channel (RACH) response (RAR). In example 57, the TA command is communicated to the UE via a media access control (MAC) control element (CE).

In example 58, and any of the preceding examples, the processor is further configured to: determine common TA value corresponding to a signal propagation delay between the satellite and the base station; and cause the common TA value to be broadcast to the UEs within the coverage area of the satellite to cause UEs to adjust transmission times of UL signals in accordance with the common TA value. In example 59, or any of the preceding examples, the processor is further configured to: determine a common timing drift rate corresponding to a change in a signal propagation delay between the satellite and the base station non-terrestrial network; and cause the common timing drift rate to be broadcast to the UEs within the coverage area of the satellite to cause UEs to adjust transmission times of UL signals in accordance with the common timing drift rate.

In example 60, or any of the preceding examples, the timing drift rate includes a UE-specific timing drift rate corresponding to a change in a signal propagation delay between the UE and the satellite. In example 61, or any of the preceding examples, the UE-specific timing drift rate is communicated to the UE via one of: a radio resource control (RRC) communication; a media access control (MAC) control element (CE); or a downlink control indicator (DCI). In example 62, or any of the preceding examples, the TA command and the UE-specific timing drift rate communicated to the UE in a single MAC CE.

In example 63, or any of the preceding examples, the UE-specific timing drift rate is a relative timing drift rate configured to modify a current timing drift rate used by the UE. In example 64, or any of the preceding examples, wherein the UE-specific timing drift rate is an absolute timing drift rate configured to replace a current timing drift rate used by the UE. In example 65, or any of the preceding examples, the base station is a 5th generation (5G) base station of a terrestrial network in communication with UE devices via one or more satellites of the NTN. In example 66, or any of the preceding examples, the base station is a satellite of the NTN, enabling communications between one or more UEs and one or more 5th generation (5G) base stations of a terrestrial network.

In example 67, a baseband (BB) circuitry, of a base station, may comprise one or more processors, connected to a RF circuitry interface and memory device, and configured to perform the instructions to: receive an uplink (UL) signal originating from a UE of the NTN; determine a timing drift rate for maintaining the TA over time based on a movement of the satellite of the NTN; and cause the timing drift rate to be communicated to the UE. In examples 68-79, the BB circuitry of example 67 being further modified by applying one or more, or any combination, of the device features of examples 55-66 as device features.

In example 80, a base station may comprise: means for receiving an uplink (UL) signal originating from a UE of the NTN; means for determining a timing drift rate for maintaining the TA over time based on a movement of the satellite of the NTN; and means for causing the timing drift rate to be communicated to the UE. In examples 81-92, the base station of example 80 being further modified by applying one or more, or any combination, of the device features of examples 55-66 as means plus function features.

In example 93, a method, permed by a base station or satellite, may comprise receiving an uplink (UL) signal originating from a UE of the NTN; determining a timing drift rate for maintaining the TA over time based on a movement of the satellite of the NTN; and causing the timing drift rate to be communicated to the UE. In examples 94-105, the method of example 93 being further modified by applying one or more, or any combination, of the device features of examples 55-66 as method features.

In example 106, a computer readable medium comprising instructions that when executed by a processor, cause the processor to: receive an uplink (UL) signal originating from a UE of the NTN; determine a timing drift rate for maintaining the TA over time based on a movement of the satellite of the NTN; and cause the timing drift rate to be communicated to the UE. In examples, 107-108, the computer readable medium of example 106 being further modified by applying one or more, or any combination, of the device features of examples 55-66 as computer-readable medium features.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A User Equipment (UE), comprising:
radio frequency (RF) circuitry configured to communicate with a wireless communication network comprising a non-terrestrial network (NTN) with a satellite;
a memory configured to store instructions; and
one or more processors, connected to the RF circuitry and the memory, and configured to:
    determine a timing advance (TA) value for modifying transmission timing of uplink (UL) signals transmitted to the wireless communication network based on a TA command received from the NTN;
    determine a timing drift rate associated with a change of a signal propagation delay of the UL signals over time; and
        cause the RF circuitry to transmit the UL signals in accordance with the TA value as modified by the timing drift rate and a measured duration of time.

2. The UE of claim 1, wherein the one or more processors are configured to determine the timing drift rate based on a common timing drift rate, broadcast to UEs in a coverage area associated with the satellite, and associated with a change of a signal propagation delay between the satellite and a base station of the wireless communication network.

3. The UE of claim 1, wherein the one or more processors are configured to determine the timing drift rate based on a UE-specific timing drift rate associated with a change of a signal propagation delay between the UE and the satellite.

4. The UE of claim 3, wherein the UE-specific timing drift rate is received from the NTN via one of:
a radio resource control (RRC) communication;
a media access control (MAC) control element (CE); or
a downlink control indicator (DCI).

5. The UE of claim 4, wherein the one or more processors are further configured to:
update the timing drift rate based on a recently received timing drift rate from the NTN; and
cause the RF circuitry to transmit UL signals based on the updated timing drift rate.

6. The UE of claim 1, wherein the one or more processors are configured to update the timing drift rate based on recently received timing drift rate by replacing the timing drift rate with the recently received timing drift rate.

7. The UE of claim 1, wherein the one or more processors are configured to update the timing drift rate based on recently received timing drift rate by combining the timing drift rate with the recently received timing drift rate.

8. The UE of claim 1, wherein the one or more processors are configured to update the TA value based on a timing drift rate information in a media access control (MAC) control element (CE).

9. The UE of claim 1, wherein the TA command is received in a media access control (MAC) control element (CE).

10. The UE of claim 1, wherein the one or more processors are configured to update the TA value based on TA information and timing drift rate information received in a joint TA command and timing drift rate message.

11. The UE of claim 1, wherein the TA command is received via a random access response (RAR).

12. The UE of claim 1, wherein the one or more processors are configured to update the TA value based on a common TA.

13. The UE of claim 1, wherein the one or more processors are configured to determine the TA value based on:
a common TA, received from the NTN via broadcast, and corresponding to a signal propagation delay between the satellite and a base station; and
a UE-specific TA, determined by the UE, based on a location of the UE and ephemeris information of the satellite.

14. A Baseband (BB) circuitry, comprising:
one or more processors, connected to a memory, and configured to:
    determine a timing advance (TA) value for modifying transmission timing of uplink (UL) signals transmitted to a wireless communication network via a satellite;
    determine a timing drift rate associated with a change of a signal propagation delay of the UL signals over time; and
        output control information indicating transmission timing of the UL signals in accordance with the TA value as modified by the timing drift rate and a measured duration of time;
    wherein the one or more processors are configured to determine the timing drift rate based on a common timing drift rate, broadcast to UEs in a coverage area associated with the satellite, and associated with a change of a signal propagation delay between the satellite and a base station.

15. A base station, comprising:
radio frequency (RF) circuitry configured to communicate with a User Equipment (UE) within a coverage area of a satellite of a non-terrestrial network (NTN);
a memory configured to store instructions; and
one or more processors, connected to the RF circuitry and the memory, and configured to:
    receive an uplink (UL) signal originating from the UE;
    determine a timing drift rate for maintaining a timing advance (TA) over time based on a movement of the satellite of the NTN; and
    cause the timing drift rate to be communicated to the UE.

16. The base station of claim 15, wherein the one or more processors are further configured to:
determine, based on the UL signal, a TA command for modifying transmission timing of uplink transmissions from the UE; and
cause the TA command to be communicated to the UE.

17. The base station of claim 16, wherein the UL signal includes a random access channel (RACH) preamble and the TA command is communicated to the UE via a random access response (RAR).

18. The base station of claim 16, wherein the TA command is communicated to the UE via a media access control (MAC) control element (CE).

19. The base station of claim 15, wherein the one or more processors are further configured to:

determine a common TA value corresponding to a signal propagation delay between the satellite and the base station; and cause the common TA value to be broadcast to a plurality of UEs within the coverage area of the satellite to cause the plurality of UEs to adjust transmission timing of UL signals in accordance with the common TA value.

20. The base station of claim 19, wherein the one or more processors are further configured to:

determine a common timing drift rate corresponding to a change in a signal propagation delay between the satellite and the base station; and cause the common timing drift rate to be broadcast to the plurality of UEs within the coverage area of the satellite to cause the plurality of UEs to adjust transmission timing of UL signals in accordance with the common timing drift rate.

* * * * *